Dec. 26, 1961  F. G. BACK  3,014,406
VARIFOCAL LENS ASSEMBLY FOR STILL CAMERA PHOTOGRAPHY
Filed Feb. 19, 1959
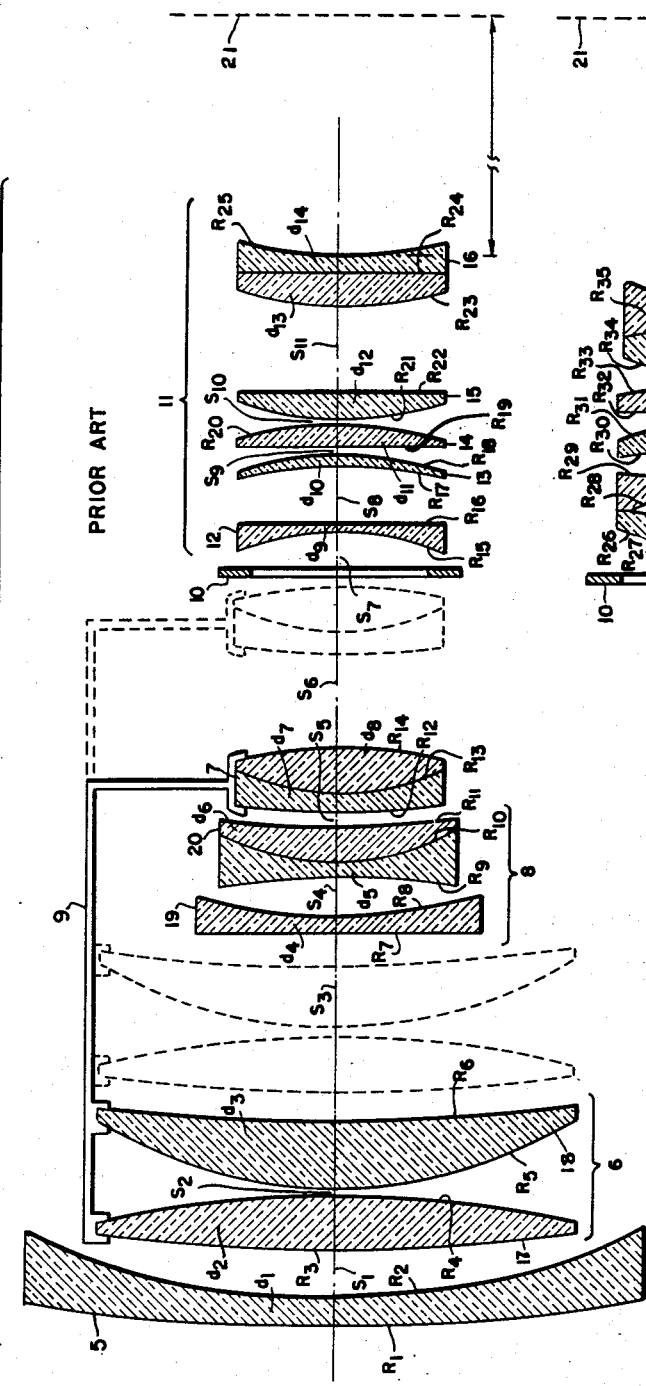
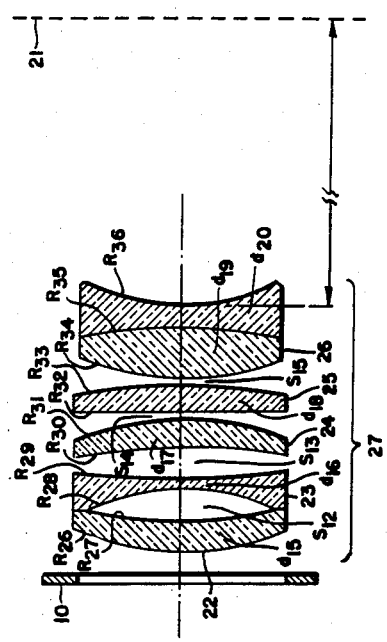
INVENTOR.
Frank G. Back
BY Albert F. Kronman
ATTORNEY

United States Patent Office 3,014,406
Patented Dec. 26, 1961

3,014,406
VARIFOCAL LENS ASSEMBLY FOR STILL
CAMERA PHOTOGRAPHY
Frank G. Back, 55 Sea Cliff Ave., Glen Cove, N.Y.
Filed Feb. 19, 1959, Ser. No. 794,323
2 Claims. (Cl. 88—57)

This invention relates to varifocal lens structures and particularly to a varifocal lens assembly for use in a single lens reflex still camera. This application is a continuation-in-part of my co-pending application Serial 745,009, filed June 27, 1958, for Varifocal Lens Assembly, now U.S. Patent No. 2,913,957.

Where it is desired to use varifocal lenses employing the principle of image shift compensation in the field of still camera photography, certain problems arise brought about by the fact that still cameras require as much as a 60° angle of field coverage whereas television and motion picture photography rarely employ more than a 35° angle. The required image correction over the larger field in a still picture has to be greater than that in television and motion picture photography.

Accordingly, it is an object of the present invention to produce the high quality image necessary in still picture photography despite the large relative aperture and a large field angle, while at the same time utilizing the advantages of a varifocal lens.

Another object of the present invention is to provide a varifocal lens system having an image correction over the entire field of light transmission far superior to previously known devices.

A further object of the present invention is to provide a varifocal lens and relay for use with still cameras which will avoid the shortcomings of presently known varifocal lenses which are not adapted to still picture photography.

A feature of the present invention is its varifocal lens assembly whereby aberrations are kept constant over the entire range of the lens section in front of the iris stop.

A further feature of the present invention is its use of a relay to compensate for the constant aberrations in the varifocal portion of the assembly.

Still another feature of the present invention is its use of a relay which has a large relative aperture.

A further feature of the present invention is its distribution of the refractive powers within the relay in such manner as to minimize residual distortion.

A feature of the present invention is its use of varifocal lens systems in which selected components consist of two or more elements separated by small fixed lens-like air spaces wherein all of the surfaces facing said fixed air spaces are stronger than those facing the variable air spaces.

Still another feature of the present invention is the use of a varifocal lens system in which certain lens surfaces which are concave towards the aperture stop must be stronger than those which are convex towards the aperture stop.

A feature of the present invention is its use of asymmetric power distribution around the fixed small air spaces.

Th invention consists of the construction, combination and arrangement of parts, as herein illustrated, described and claimed.

In the accompanying drawings, forming a part hereof are illustrated two forms of embodiment of the invention and in which:

FIGURE 1 is a view in longitudinal section of complete optically compensated varifocal lens constituting one embodiment of the present invention with the movable element in the rear position indicated by dashed lines.

FIGURE 2 is a view in longitudinal section of a second form of relay for use in conjunction with the varifocal lens system shown in FIGURE 1.

Referring to the drawing and specifically to FIGURE 1, 5 indicates a front lens member of dispersive power. A pair of axially slidable lenses fixed with respect to each other of collective power, hereinafter referred to as the variator 6, is disposed behind the front lens 5. A stationary dispersive element 8 is disposed behind the variator 6 and is known as the erector. The erector 8 also consists of a pair of lenses 19, 20. A movable collective system hereinafter referred to as the compensator 7 is linked to the variator 6 by means of a coupling member 9. The compensator 7 has a strong positive power.

A stationary aperture stop 10 is located behind the compensator 7. Behind the aperture stop 10, there is disposed a multiple element system 11, known as the relay. The relay 11 has collective power in order to produce a real image and is followed at the proper distance by the image plane 21.

In the embodiments shown herein the small fixed air spaces are considered as having the properties of lenses bounded by the curved surfaces of the lens elements adjacent thereto. The variator 6 which consists of a pair of spaced lenses 17 and 18, and which has been described as being of collective power is separated by a small fixed air space $S_2$, which is also of collective power. The erector 8 consisting of a pair of lenses 19, 20 has strong refractive surfaces $R_8$, $R_9$, which are separated by a small fixed air space $S_4$, which in contrast with the variator $S_2$ is strongly dispersive.

In order to produce the high quality image required by present day still photography at a large relative aperture and a large field angle, certain characteristics within the lens system must be present. The dispersive front lens 5 must be shaped in such manner that its stronger dispersive surface $R_2$, is concave toward the aperture stop 10. In addition, the movable variator 6 behind the front lens 5 and also the stationary erector 8 behind the variator 6, both of which consist of a pair of lenses 17, 18, and 19, 20, in juxtaposition, and whose fixed inner spaces $S_2$, $S_4$, are enclosed by two strongly refractive surfaces $R_4$, $R_5$, and $R_8$, $R_9$, respectively, have said enclosing surfaces asymmetrically arranged in such a way that the surfaces $R_5$, $R_8$, concave toward the aperture stop 10, is in each case, stronger than surfaces $R_4$, $R_9$, which are convex towards the aperture stop. The compensator 7, which is axially slidable with the variator 6, is positioned between the erector 8 and the aperture stop 10, has at least one collective outside surface $R_{14}$, with a power of more than 25% and not more than 125% of the total power of the varifocal objective image in its middle position.

This relationship may be expressed as follows:

$$0.25\Phi_m < \phi R_{14} < 1.25\Phi_m$$

Where $\Phi_m$ = the power of the whole system in its middle position
$\phi R$ = the refractive surface power I have found that the asymmetry of power distribution between the strongly refractive surfaces $R_4$, $R_5$, $R_8$, $R_9$, adjacent to the fixed inner air gaps have to be the larger, the faster the required speed of the lens (the greater the diameter of the bundle of light rays entering the system) and the wider the desired maximum field angle. Accordingly, the inner surface $R_8$, of the erector 8, which is concave towards the aperture stop 10, must be more than 15% stronger than but not more than 115% of the neighboring surface $R_9$, enclosing the air gap $S_4$, which surface is convex towards the stop 10. This means:

$$1.15\phi R_9 < \phi R_8 < 2.15\phi R_9$$

In the movable variator 6, the inner surface $R_5$, which is concave toward the stop 10, must have more than 40% but not more than 220% greater refractive power than its opposed surface $R_4$, which is convex towards the stop 10. This relationship may also be expressed:

$$1.4\phi R_4 < \phi R_5 < 3.2\phi R_4$$

Because it is essential to the satisfactory functioning of the present lens systems that the asymmetry be the greater the longer the light path from these neighboring surfaces to the aperture stop 10 becomes.

I have also discovered that for obtaining very large field angles the pair of inner surfaces $R_4$, $R_5$, of the variator 6, which are relatively far from the stop 10, preferably have the following power distribution:

$$\phi R_5 > 1.66\phi R_4$$

The surface $R_5$, of the variator 6, which is concave towards the aperture stop 10 therefor, must have a power greater than 5/3 of the power of the adjoining surface $R_4$, which is convex towards the stop.

An example of an optically compensated varifocal lens system made in accordance with the foregoing is:

It will be seen from the above that the following relationships apply:

$$0.20\Phi_m < |\phi \text{Front}| < 0.65\Phi_m$$
$$0.65\Phi_m < |\phi \text{Variator}| < 1.30\Phi_m$$
$$0.90\Phi_m < |\phi \text{Erector}| < 1.80\Phi_m$$
$$0.65\Phi_m < |\phi \text{Compensator}| < 1.30\Phi_m$$

If the basic power of each of the basic components is kept within the above given limits, not only satisfactory compensation for zoom deviation is achieved but also the zonal residual aberrations can be kept within very small limits.

In the embodiment herein illustrated in FIGURES 1 and 2, it is possible to achieve a varifocal objective with wide maximum field angle in combination with a large relative aperture, so that the relay itself also has to have a large relative aperture. Varifocal systems made in accordance with the present invention with a large field angle and a relative aperture of up to 1:2.7, can be constructed, if in addition to the previously mentioned characteristics, the relay 11 is made in the following manner:

The relay 11, disposed behind the aperture stop 10 has on the side closest to the aperture stop 10, a lens element 12, which has a highly dispersive concave surface $R_{15}$, toward the stop 10. The power of said surface $R_{15}$, is preferably more than 75% of but not more than 275% of the power of the whole system in its middle position.

Or: $$0.75\Phi_m < |\phi R_{15}| < 2.75\Phi_m$$

Behind the lens 12 are asymmetric collective components 13, 14, 15, which in turn are followed by a meniscus 16, concave towards the image plane 21.

In this form of the relay 11, the strongly dispersive surface $R_{15}$, close to the aperture stop 10, produces an astigmatic field flattening, and reduces coma. The concave surface $R_{25}$ of the meniscus 16, closest to the image plane 21, serves to control distortion, particularly in view of the large field angle. If the residual distortion has to be kept very small, it can normally be achieved only at the expense of coma. However, in the present invention, this result can also be avoided if the refractive power within the relay 11, is distributed as hereinafter set forth.

| Lens No. | Radius (R) (mm.) | Thickness ($d$) and Air Spacing (S) | Glass (Cat. Ref.) | Index ($N_D$) | Dispersion (V) |
|---|---|---|---|---|---|
| Front Lens 5 | $R_1 = +817.00$ | $d_1 = 2.50$ | EDF | $N_{D1} = 1.689$ | $V_1 = 30.9$ |
|  | $R_2 = +82.00$ | $S_1 = 6.00$ to $26.00$ |  |  |  |
| Variator No. 1, 17 | $R_3 = +372.20$ | $d_2 = 6.00$ | DBC | $N_{D2} = 1.620$ | $V_2 = 60.0$ |
|  | $R_4 = -114.00$ | $S_2 = 0.30$ |  |  |  |
| Variator No. 2, 18 | $R_5 = +56.70$ | $d_3 = 8.00$ | DBC | $N_{D3} = 1.620$ | $V_3 = 60.0$ |
|  | $R_6 = +372.20$ | $S_{12} = 2.00$ to $2.00$ |  |  |  |
| Erector No. 1, 19 | $R_7 = \text{Inf.}$ | $d_4 = 2.00$ | LaC | $N_{D4} = 1.720$ | $V_4 = 50.3$ |
|  | $R_8 = +66.60$ | $S_4 = 4.25$ |  |  |  |
| Erector No. 2, 20 | $R_9 = -93.50$ | $d_5 = 1.80$ | LaC | $N_{D5} = 1.720$ | $V_5 = 50.3$ |
|  | $R_{10} = +25.00$ | $d_6 = 3.70$ | EDF | $N_{D6} = 1.721$ | $V_6 = 29.3$ |
|  | $R_{11} = +140.20$ | $S_5 = 1.80$ to $21.80$ |  |  |  |
| Compensator 7 | $R_{12} = +107.60$ | $d_7 = 2.00$ | DBC | $N_{D7} = 1.620$ | $V_7 = 60.0$ |
|  | $R_{13} = +25.00$ | $d_8 = 5.00$ | DF | $N_{D8} = 1.621$ | $V_8 = 36.2$ |
|  | $R_{14} = +58.85$ | $S_6 = 21.00$ to $1.00$ Stop $S_7 = 4.50$ |  |  |  |

Radius, thickness and spacing in millimeters.

An example of a relay for an optically compensated varifocal lens system made in accordance with the foregoing is:

| Lens No. | (mm.) Radius (R) | Thickness (d), Air Spacing (S) | Glass (Cat. Ref.) | Index $N_D$ | Dispersion (V) |
|---|---|---|---|---|---|
| 12 | $R_{15}=-22.40$<br>$R_{16}=-327.40$ | $d_9=1.50$<br>$S_8=8.75$ | LaC | $N_{D12}=1.720$ | $V_{12}=50.3$ |
| 13 | $R_{17}=-68.40$<br>$R_{18}=-28.00$ | $d_{10}=3.70$<br>$S_9=0.50$ | DBC | $N_{D13}=1.620$ | $V_{13}=60.3$ |
| 14 | $R_{19}=$Inf.<br>$R_{20}=-63.10$ | $d_{11}=3.00$<br>$S_{10}=0.50$ | DBC | $N_{D14}=1.620$ | $V_{14}=60.0$ |
| 15 | $R_{21}=+54.10$<br>$R_{22}=-231.50$ | $d_{12}=3.40$<br>$S_{11}=13.50$ | DBC | $N_{D15}=1.620$ | $V_{15}=60.0$ |
| 16 | $R_{23}=+38.20$<br>$R_{24}=-167.80$<br>$R_{25}=+24.30$ | $d_{13}=5.00$<br>$d_{14}=1.50$ | DBC<br>EDF | $N_{D16}=1.620$<br>$N_{D16}=1.721$ | $V_{16}=60.0$<br>$V_{16}=29.3$ |

Equivalent focal length of whole system (E.F.L.)=80.00–40.00.
Back focal length of whole system (B.F.L.)=41.10.
Radius, thickness and spacing in millimeters.

The power in the above relay is distributed in the following way:

The relay 11 consists of a plurality of components disposed in such manner that a negative lens 12 is located close to the aperture stop 10, having a hollow stronger refractive surface $R_{15}$, toward the stop 10, while on the image side there is a negative meniscus 16, concave towards the image 21. Between said components there is a plurality of inside components 13, 14, 15, which include two collective air spaces, such that the sum of their refractive power is more than twice but not more than six times the equivalent power of the whole system in its middle position.

This relationship may be expressed:

$$2.0\Phi_m < \phi(S_9+S_{10}) < 6.0\Phi_m$$

Referring to FIGURE 2 there is shown a second form of relay 27 for use with the varifocal system shown in FIGURE 1. It will be seen that the relay 27 is disposed behind the aperture stop 10. On the side closest to the aperture stop 10 there is provided at least two lens elements, one of which has a highly dispersive concave surface indicated at $R_{28}$ towards the said stop 10. The absolute numerical power of the said surface $R_{28}$ is more than 75% but not more than 275% of the power of the whole system in its middle position. The lens 23 of the relay 27 is preceded by a meniscus 22, having very weak power. Behind the lenses 22, 23, is an asymmetric collective two lens component 24, 25, which in turn is followed by a meniscus 26 concave towards the image 21. In this second embodiment as in the first, the strongly dispersive concave surface $R_{28}$, close to the aperture stop 10 serves to bring about an astigmatic field flattening, and to reduce the previously mentioned coma. In the meniscus 26, closest to the image plane 21, the concave surface $R_{36}$, acts to control distortion, which might be expected in view of the large field angle. It will be observed that the relay 27 consists of a plurality of components so arranged that close to the aperture stop 10 there is disposed a negative lens 23 with a hollow stronger refractive surface $R_{28}$, towards the stop, while on the image side there is a negative meniscus 26 concave towards the image 21. Between the components 23 and 26, there is a plurality of inside components 24 and 25, which include two small lens-like air spaces $S_{14}$ and $S_{15}$, so arranged that the total power of these two air spaces is greater than two and one-half times but not more than seven and one-half times the equivalent power of the total varifocal objective in its middle position if set for the geometric means of magnification.

Or:

$$2.5\Phi_m < \phi(S_{14}+S_{15}) < 7.5\Phi_m$$

In the relay 27 the performance of the lens system in the wide angle position has been improved at the expense of the telescopic position. The relay 27, in other words, shifts the image quality from the telescopic to the wide angle position. The use of the meniscus 22 shortens the assembly and permits a decrease in the diameter of all of the lenses and especially the two asymmetric components 24, 25, in order to achieve this result without loss of the image quality, the meniscus 22 must be of the following power: It must have a power which lies between 0 and 0.75 times the absolute value of the power of the surface $R_{28}$ on the lens 23, which means:

$$0 < \phi_{22} < 0.75\phi R_{28}$$

The following table gives the optical characteristics of the relay system 27 shown in FIGURE 2 and described above:

| Lens No. | (mm.) Radius (R) | Thickness (d), Air Spacing (S) | Glass (Cat. Ref.) | Index $N_D$ | Dispersion (V) |
|---|---|---|---|---|---|
| 22 | $R_{26}=+23.57$<br>$R_{27}=+34.42$ | $d_{15}=3.00$<br>$S_{12}=3.30$ | F-2 | 1.620 | 36.34 |
| 23 | $R_{28}=-24.88$<br>$R_{29}=+122.00$ | $d_{16}=1.50$<br>$S_{13}=2.50$ | BaSFS-1 | 1.7015 | 41.0 |
| 24 | $R_{30}=-80.70$<br>$R_{31}=-26.75$ | $d_{17}=3.20$<br>$S_{14}=0.50$ | LaK-17 | 1.78847 | 50.45 |
| 25 | $R_{32}=+600.00$<br>$R_{33}=-54.32$ | $d_{18}=2.80$<br>$S_{15}=0.30$ | LaK-17 | 1.78847 | 50.45 |
| 26 | $R_{34}=+25.24$<br>$R_{35}=-50.27$<br>$R_{36}=+18.56$ | $d_{19}=5.20$<br>$d_{20}=2.00$ | SK-16<br>F-2 | 1.6204<br>1.620 | 60.29<br>36.34 |

BaSFS stands for Special Dense Barium Flint (Schott).
Equivalent focal length (E.F.L.)=$f_2$=80.00 to 40.00 (approx.) of the whole system.
Back focal length of whole system (B.F.L.)=40.10.
Radius (R), thickness (d), and spacing (S) in millimeters.

In the present embodiment of the invention the stationary lenses in the varifocal portion of the system have negative power and the movable elements are positive. However, it is known that a varifocal lens can be made wherein the stationary lenses have positive power and the movable lenses are negative and such substitution can be made without departing from the spirit of the present invention. Notwithstanding such changes in the specific arrangement of lens elements, I have found that certain relationships must be maintained in order to achieve the desired results. Some of the components have to consist of two or more lenses enclosing small fixed lens-like air spaces. Lens surfaces facing said fixed air spaces within the system must be stronger than those facing the variable air spaces. In addition of those lens surfaces adjacent said fixed air spaces, those which are concave towards the aperture stop must be stronger than those surfaces which are convex towards the aperture stop.

The chromatically corrective cemented surfaces $R_{10}$ in the erector 8, $R_{13}$ in the compensator $R_{24}$ in the relay lens 16, and $R_{36}$ in the relays lens 26, are all preferably disposed concave toward the aperture stop 10 to achieve good color correction as well as the chromatic variations of the monochromatic aberrations, especially spherical aberrations.

Having thus fully described the invention, what is claimed as new and desired to be secured by Letters Patent of the United States, is:

1. A varifocal lens system for single lens reflex cameras comprising, a front section of variable focal length, including an axially slidable air spaced variator and compensator and a stationary erector therebetween, an aperture stop spaced from the front section and a rear section of fixed focal length including a relay having five elements therein with optical characteristics of the following order wherein $N_D$ is the refractive index for the D line, V is Abbe's dispersion number, LaK stands for lanthanum crown, BaSFS stands for special dense barium flint (Schott), F indicates flint and SK designates dense crown.

| Lens No. | (mm.) Radius (R) | Thickness (d), Air Spacing (S) | Glass (Cat. Ref.) | Index $N_D$ | Dispersion (V) |
|---|---|---|---|---|---|
| 22 | $R_{26}=+23.57$ | $d_{15}=3.00$ | F-2 | 1.620 | 36.34 |
|    | $R_{27}=+34.42$ | $S_{12}=3.30$ |     |       |       |
| 23 | $R_{28}=-24.88$ | $d_{16}=1.50$ | BaSFS-1 | 1.7015 | 41.0 |
|    | $R_{29}=+122.00$ | $S_{13}=2.50$ |    |       |       |
| 24 | $R_{30}=-80.70$ | $d_{17}=3.20$ | LaK-17 | 1.78847 | 50.45 |
|    | $R_{31}=-26.75$ | $S_{14}=0.50$ |    |       |       |
| 25 | $R_{32}=+600.00$ | $d_{18}=2.80$ | LaK-17 | 1.78847 | 50.45 |
|    | $R_{33}=-54.32$ | $S_{15}=0.30$ |    |       |       |
| 26 | $R_{34}=+25.24$ | $d_{19}=5.20$ | SK-16 | 1.6204 | 60.29 |
|    | $R_{35}=-50.27$ | $d_{20}=2.00$ | F-2 | 1.620 | 36.34 |
|    | $R_{36}=+18.56$ |               |     |       |       |

Radius, thickness and spacing in millimeters; ($R_{26}$ to $R_{36}$) = the radius of curvature of successive lens surfaces in the direction of the incident light; ($d_{15}$ to $d_{20}$) = the successive axial thicknesses of the several lens elements; ($S_{12}$ to $S_{15}$) = the successive axial separations of the several lens elements; and $f=35$ to $80$ mm. = the equivalent focal length (EFL) of the relay lens.

2. A varifocal lens assembly for use in still picture photography comprising, a front lens of dispersive power, a variator consisting of spaced axially slidable lenses of collective power behind the front lens, a fixed air space of strongly collective power between the variator lenses, an erector behind the variator comprising spaced lenses, a fixed strongly dispersive air space defined by the inner stronger refractive surfaces of the erector, a compensator consisting of a second axially slidable collective lens system, said compensator being coupled to the variator for axial movement therewith, a stationary aperture stop behind the compensator and a relay of collective power behind the stationary stop to produce an image upon an image plane, said relay having a first positive component adjacent the aperture stop of a power $\phi_{22}$ of between zero and 0.75 times the absolute value of the power of the surface $R_{28}$ of the lens 23 of the relay system to fulfill the following condition: $0<\phi_{22}<0.75|\phi R_{28}|$ said positive component being followed by a first negative component, a highly dispersive front surface $R_{28}$ on the first negative component concave toward the aperture stop the absolute numerical power of which is more than 75% but less than 275% of the power of the whole system in its middle position, said front surface being adapted to effect astigmatic field flattening and reduce coma, a plurality of positive components following the first negative component, two small lens-like air spaces $S_{14}$, $S_{15}$, between said positive components the power of said air spaces being greater than 2½ times but less than 7½ times the equivalent power of the total varifocal lens assembly in its middle position to fulfill the mathematical condition: $2.5\Phi_m<\phi(S_{14}+S_{15})<7.5\Phi_m$ a last negative component forming with the last of the plurality of positive components, a negative meniscus concave toward the image the concave rear surface of which is adapted to control distortion caused by the large field angle.

References Cited in the file of this patent
UNITED STATES PATENTS

| | | |
|---|---|---|
| 1,584,272 | Bertele | May 11, 1926 |
| 2,566,485 | Cuvillier | Sept. 4, 1951 |
| 2,685,229 | Schulz et al. | Aug. 3, 1954 |
| 2,704,487 | Rosier | Mar. 22, 1955 |
| 2,718,817 | Back et al. | Sept. 27, 1955 |
| 2,719,457 | Tripp | Oct. 4, 1955 |
| 2,741,947 | Back | Apr. 17, 1956 |
| 2,778,272 | Reymond | Jan. 22, 1957 |
| 2,782,684 | Hopkins | Feb. 26, 1957 |

FOREIGN PATENTS

| | | |
|---|---|---|
| 1,150,483 | France | Aug. 12, 1957 |

OTHER REFERENCES

"General Theory of Optically Compensated Varifocal Systems," Bergstein, Journal of the Optical Society of America, vol. 48, No. 3 (March 1958), p. 170.